Patented Mar. 24, 1936

2,035,386

UNITED STATES PATENT OFFICE 2,035,386

PROCESS OF PRODUCING CONDENSATION PRODUCTS OF HALOGENATED ALIPHATIC ETHERS

Paul L. Salzberg, Wilmington, Del., assignor to E. I. du Pont de Nemours & Company, Wilmington, Del., a corporation of Delaware No Drawing. Application March 14, 1933, Serial No. 660,645

11 Claims. (Cl. 260—54)

This invention relates to a process for the preparation of condensation products obtained from the halogenated aliphatic ethers and more particularly from the mono- or poly-halogenated aliphatic alkyl ethers.

An object of the present invention is to provide a process for the preparation of condensation products of the halogenated aliphatic ethers. Another object of the invention is to provide a process for the preparation of condensation products from the mono- and poly-halogenated alkyl ethers. A further object of the invention is to provide a process for the preparation of dimethyl ether of ethylene glycol, ethylene oxide, and diethylene oxide, from monochlor-dimethyl ether and/or dichlordimethyl ether, and homologous compounds from the corresponding higher halogenated ethers. Other objects and advantages will hereinafter appear.

According to the present invention valuable products are obtained from the condensation of the halogenated aliphatic ethers. The condensation may be effected by the loss from two or more molecules of similar or dissimilar mono-halogenated ethers of a single atom of chlorine from one molecule with a hydrogen from an adjacent molecule, giving a carbon-carbon linkage and forming lineal polymers, of the type CH₃OCH₂(CH₂OCH₂)xCH₂OCH₂Cl where x may be any number. In some instances the loss of both hydrogen and chlorine from a single molecule of the mono-halogenated aliphatic ethers forms cyclical condensation products. From the dihalogenated aliphatic ethers the loss of two halogen atoms from a single molecule results usually in the preparation of a cyclical compound, while the loss of two atoms of the halogen from each of two molecules of the dihalogenated aliphatic ethers results in the formation of higher cyclical compounds and/or linear polymers of the type ClCH₂OCH₂(CH₂OCH₂)xCH₂O—CH₂Cl For example, there may be obtained from monochlor-dimethyl ether,—ethylene oxide, diethylene oxide, and dimethyl ether of ethylene glycol, which are believed to be formed in accord with the following reactions:

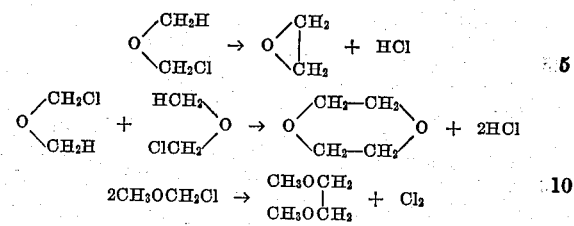

Similarly, from the dichloro-dimethyl ether, ethylene oxide and diethylene oxide may be obtained by condensation reactions of the following type:

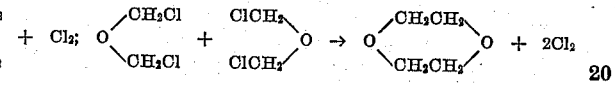

The halogenated aliphatic ethers that may be condensed in accord with my process to obtain valuable cyclical and lineal condensation products include, by way of example, to which compounds only, however, my invention is not to be limited, the halogenated derivatives, i. e. the chlorine, bromine, iodine, and fluorine derivatives of the aliphatic ethers, such as monochlor-dimethyl ether, dibrom-dimethyl ether, gamma chlorpropylmethyl ether, gamma chlorbutylmethyl ether, beta-beta'dichlordiethyl ether, beta-chlorethylmethyl ether, gamma-gamma'-dichlordipropyl ether, and homologous ether halides. When reference is made in the application and claims to condensation, the usual definition of the word will be implied, i. e. it will imply the formation of a carbon-carbon linkage between two carbons of the same or different molecules e. g. by halogen and halogen halide elimination.

The dehalogenation of these and equivalent halogenated aliphatic ethers may be effected in either the liquid or vapor phase, and the selection of either phase will be determined by the physical characteristics of the ether to be condensed and the type of condensing agent to be employed. Condensing agents for use in the liquid phase include, for example, metallic sodium, powdered zinc, powdered magnesium; other finely divided metals adapted for dehalogenation may be used. These condensing agents are employed preferably at temperatures ranging from 50–100° C. and under pressure ranging from atmospheric pressures to pressures in the neighborhood of 200 atmospheres or higher, the pressure being apparently limited only by the strength of the apparatus. When effecting condensation of the more highly volatile ethers they are preferably reacted in the vapor phase. In this phase the ethers are passed over a suitable catalyst, such, for example, as finely divided copper, nickel, platinum with barium sulphate, and the like; the temperature employed may be in the neighborhood of 100–250° C., with pressures preferably above atmospheric and ranging to 100 atmospheres and higher.

I will now give examples illustrating methods according to which my invention may be carried out, but it will be understood that the invention will not be limited thereby except as it may be restricted by the appended claims.

*Example 1.*—80.5 parts of monochlor-dimethyl ether are admixed with 23 parts of metallic sodium at a temperature below the boiling point of the ether, the resulting mixture being sealed in an autoclave and heated to a temperature of approximately 100° C. until reaction ceases. The pressure will, of course, be developed on heating, this pressure being higher at first and then subsiding as the reacting materials are converted into the less volatile products. The higher the temperature, the greater the pressure and likewise the greater the velocity of the reaction. The final product contains a mixture of ethylene oxides, and ethers of the ethylene glycols.

*Example 2.*—Vaporized dichlor-diethyl ether is passed at a temperature of approximately 150° C. and a pressure in the neighborhood of 150 atmospheres over a finely divided copper catalyst disposed in a suitable catalytic reaction chamber. The products issuing from the reaction chamber are condensed and a condensate obtained containing a mixture of ethylene oxide, dioxan and some unconverted dichlor-diethyl ether.

The glycol ethers obtained by these condensation reactions, as well as the ethylene oxides, are in general good solvents and plasticizers for the cellulose derivatives including cellulose acetate, cellulose nitrate, cellulose ethers, and the cellulose derivatives of the higher aliphatic acids. The condensation compounds of the halogenated ethers boil from approximately 10° C. up, the lower boiling constituent being ethylene oxide, while the higher boiling constituents boiling above 85° C. include dioxan, dimethyl cellosolve, and other ethers of the ethylene glycols. These compounds may be used as solvents or plasticizers in conjunction with a wide variety of other solvents and diluents, in a manner usually employed in the cellulose ester art. Valuable materials for this purpose are produced when a mixture of the glycol ethers and esters of the ethylene glycols are employed, the mixture in many instances having superior solvent and plasticizing action to the individual components thereof.

From a consideration of the above invention it will be appreciated that any process involving the condensation of the halogenated aliphatic ethers will come within the scope of this invention providing the condensation be effected in the manner as hereinbefore described.

I claim:

1. In a process of producing condensation products of the halogenated alkyl ethers in which any alkyl radical contains no more than one halogen the step which comprises condensing a halogenated alkyl mono ether in the presence of a catalyst capable of removing the halogen with the formation of a carbon-carbon linkage at a temperature of 50–100° C.

2. In a process of producing condensation products of the halogenated alkyl ethers in which any alkyl radical contains no more than one halogen the step which comprises condensing a halogenated alkyl mono ether in the presence of a finely divided metal catalyst capable of removing the halogen with the formation of a carbon-carbon linkage at a temperature of 50–100° C.

3. In a process of producing condensation products of the monohalogenated aliphatic ethers the step which comprises condensing a monohalogenated aliphatic mono ether in the presence of a dehalogenating and condensing agent at a temperature of 50–100° C.

4. In a process of producing a condensation product of the halogenated propyl ethers in which any alkyl radical contains no more than one halogen the step which comprises condensing a halogenated propyl ether in the presence of a dehalogenating and condensing agent at a temperature of 50–100° C.

5. In a process of producing condensation products of the halogen-substituted aliphatic ethers in which any alkyl radical contains no more than one halogen the step which comprises condensing an alpha-halogenated aliphatic mono ether in the presence of a dehalogenating and condensing agent at a temperature of 50–100° C.

6. In a process of producing condensation products of the halogen-substituted aliphatic ethers in which any alkyl radical contains no more than one halogen the step which comprises condensing a gamma-halogenated aliphatic ether in the presence of a dehalogenating and condensing agent.

7. In a process of producing condensation products of a gamma-chlor-propylmethyl ether the step which comprises condensing a gamma-chlorpropylmethyl ether with a dehalogenating and condensing agent.

8. In a process of producing condensation products of the halogenated methyl ethers in which any methyl radical contains no more than one halogen the step which comprises condensing the halogenated methyl ether in the presence of a dehalogenating and condensing agent at a temperature of 50–100° C.

9. In a process of producing condensation products of monochlormethyl ether the step which comprises condensing the monochlormethyl ether in the presence of a dehalogenating and condensing agent at a temperature of 50–100° C.

10. In a process of producing condensation products of dichlordimethyl ether the step which comprises condensing the dichlordimethyl ether with a dehalogenating and condensing agent.

11. In a process of producing condensation products of the halogenated aliphatic ethers in which any alkyl group contains no more than one halogen, the step which comprises condensing the aliphatic monoether in the presence of a catalyst selected from the group consisting of metallic sodium, powdered zinc, and powdered magnesium, at a temperature of 50–100° C.

PAUL L. SALZBERG.